(No Model.)
H. C. YOUNG.
WHEEL CULTIVATOR.
No. 598,461.　　　　　　　　　　Patented Feb. 1, 1898.
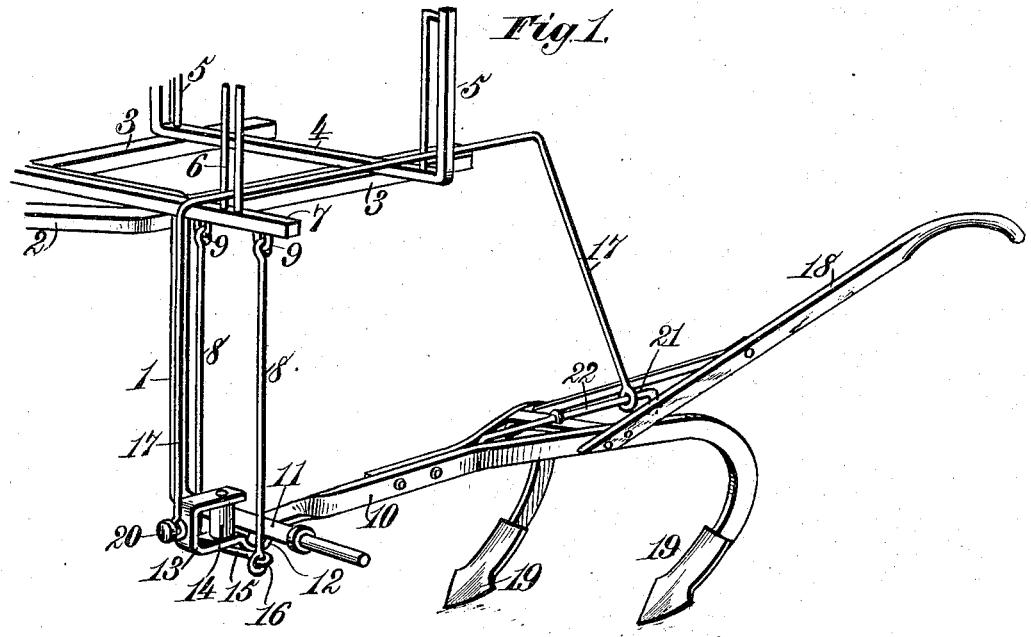
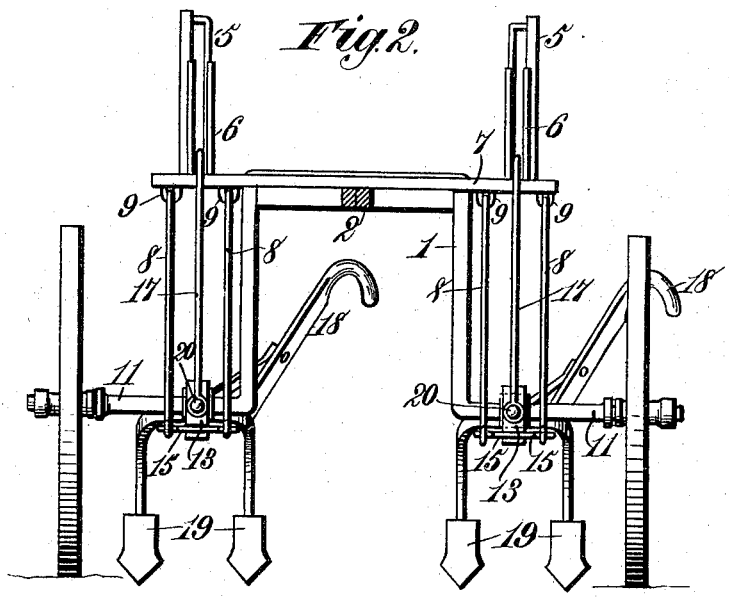
Witnesses.　　　　　　　　　　Inventor.
　　　　　　　　　　　　　　　Hiram C. Young.
　　　　　　　　　　　　　By James L. Norris.
　　　　　　　　　　　　　　　　　　Atty.

UNITED STATES PATENT OFFICE.

HIRAM C. YOUNG, OF GOOSE CREEK, KENTUCKY.

WHEEL-CULTIVATOR.

SPECIFICATION forming part of Letters Patent No. 598,461, dated February 1, 1898.

Application filed July 19, 1897. Serial No. 645,109. (No model.)

*To all whom it may concern:*

Be it known that I, HIRAM C. YOUNG, a citizen of the United States, residing at Goose Creek, in the county of Jefferson and State of Kentucky, have invented new and useful Improvements in Wheel-Cultivators, of which the following is a specification.

This invention relates to wheeled cultivators, and has for its object to improve that class of two-horse cultivators in which provision is made for shifting the line of draft for either plow by simply moving the plow-handle either to the right or left, thereby causing the line of draft to always coincide with the line of motion, thus making the plow easy to hold and also keeping the shovels in the same position at right angles to the line of motion without regard to the distance between the two parallel plows, which are independently adjustable toward and from each other to vary the line of draft for either plow or both plows as may be required.

The invention consists in features of construction and novel combinations of parts in a cultivator, as hereinafter described and claimed.

In the annexed drawings, illustrating the invention, Figure 1 is a perspective of a portion of one side of a two-horse cultivator embodying my improvements. Fig. 2 is a front elevation of the same, showing the tongue in cross-section.

Referring to the drawings, the numeral 1 designates an arched axle, and 2 is a tongue or pole, the rear portion of which is bifurcated and secured to the upper horizontal part of the axle-arch. As shown, the bifurcation of the tongue 2 is extended rearward beyond the point of attachment to the axle-arch, so as to provide two parallel and rearwardly-projecting horizontal extensions 3 of suitable length. A cross-bar 4 is secured to these extensions or bars 3 near their rear ends and is extended laterally beyond the same. At or near each end of the cross-bar 4 there is a vertical guide 5, in line with a vertical guide 6, supported on a cross-bar 7, that is secured to the tongue 2 at points in front of and near to the axle-arch. The ends of the front cross-bar 7 project laterally to a somewhat farther extent than the laterally-projecting ends of the rear cross-bar 4 and afford attachment for laterally and forwardly swinging suspension-rods 8, the upper ends of which are hooked and pivotally engaged with eyes 9 on the under portion of the cross-bar 7 at each side of the vertical guides 6, that are provided near each end of the said front cross-bar.

The forward end portion of each plow-beam 10 is extended beneath one of the lower horizontal arms 11 of the arched axle and is preferably formed with a depending bend 12 to clear the axle-arm. At its forward end each plow-beam is provided with a boxing 13, in which is journaled a vertical roller 14, that runs along the front of the axle-arm 11 in shifting the line of draft toward or from the central longitudinal axis of the machine. From the under portion of the boxing 13 there project two lateral arms 15, one on each side, and each of these arms is provided with an eye 16, in which is engaged the lower hooked end of one of the suspension-rods 8, by which the forward end of the plow-beam is supported.

In the rear vertical guide 5 and forward vertical guide 6, at each side of the cultivator-frame, there is received and supported a longitudinally-arranged bail 17, the depending arms of which are connected with a plow-beam at front and rear, so that by lifting the handle 18 of either plow and moving it either to the right or left a corresponding shifting of the line of draft will be instantly accomplished without affecting or changing the proper position of the shovels 19 at right angles to the line of motion. Thus the line of draft will always coincide with the line of motion for the shovels, so that it is made easy for the operator to guide the plows and dodge the crooked hills, as in cultivating corn or other plants.

The forward depending end of the bail 17 is attached to a stud 20 on the front of the boxing 13 at the forward end of the plow-beam, and the rear depending end of said bail is formed with an eye 21, that rides on a rod or arm 22, projecting rearward from the plow-beam adjacent to the plow-handle.

It will be observed that the guides 5 and 6 project vertically a sufficient distance to allow for all necessary vertical movement of the plow-beam and attached bail, while the suspension-rods 8 not only afford a strong and reliable support for the forward end of the beam, but also serve to limit any tendency to forward movement in shifting the line of draft.

The purpose of the bail 17 is to shift the line of draft and cause both ends of the plow-beam to move simultaneously and in substantial parallelism whenever the plow-handle 18 is shifted either to the right or left toward or from the opposite and parallel plow.

In the manner of suspending and operating the two plows as described each is wholly independent of the other, and this is an important practical arrangement the advantage of which will be obvious, as in cultivating corn, for instance, the distance between the two plows must be frequently varied in order to avoid hills of corn that may be out of line with the row.

The described attachments for shifting the line of draft can be readily applied to parallel shovel-plows, such as are in common use, the plow-beams being independent, and the improved machine can be easily operated, so as to always carry the shovels in the required direction for effective and economical work.

What I claim as my invention is—

1. In a cultivator, the combination with the independent plow-beams, and a frame from which the forward end of each plow-beam is suspended, of vertical guides on said frame, and longitudinally-arranged bails mounted in said guides and each connected with a plow-beam at front and rear, whereby a movement of the handle of either plow to the right or left will shift the line of draft and maintain the position of the shovels at right angles to the line of motion, substantially as described.

2. In a cultivator, the combination of the arched axle, a frame mounted on the axle-arch and comprising front and rear cross-bars having vertical guides at or near their ends, independent plow-beams having their forward ends extended beneath the axle-arms and each provided with a roller to run along the front of an axle-arm, suspension-rods connecting the forward ends of the plow-beams with the said front cross-bar of the frame, and longitudinally-arranged bails mounted in the vertical guides on said frame and each connected with a plow-beam at front and rear, whereby a movement of the handle of either plow to the right or left will shift the line of draft and maintain the position of the shovels at right angles to the line of motion, substantially as described.

In testimony whereof I have hereunto set my hand in presence of two subscribing witnesses.

HIRAM C. YOUNG.

Witnesses:
  WM. CARTER,
  CHAS. A. RAY.